(12) United States Patent
Yoon

(10) Patent No.: US 6,226,039 B1
(45) Date of Patent: May 1, 2001

(54) AUTOMATIC ASPECT RATIO CONVERTING APPARATUS FOR TELEVISION RECEIVER

(75) Inventor: Yeo Gyun Yoon, Taegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/998,077

(22) Filed: Dec. 24, 1997

(30) Foreign Application Priority Data

Dec. 24, 1996 (KR) .................................. P96-71302

(51) Int. Cl.⁷ ....................................... H04N 7/01
(52) U.S. Cl. ........................................ 348/445; 348/556
(58) Field of Search ................... 348/441, 445, 348/458, 563, 564, 556, 558, 588; H04N 7/01, 5/46, 5/44

(56) References Cited

U.S. PATENT DOCUMENTS

| | | | |
|---|---|---|---|
| 4,153,896 | * | 5/1979 | White . |
| 4,276,565 | * | 6/1981 | Dalton et al. . |
| 4,496,974 | * | 1/1985 | Heitmann ............................ 348/458 |
| 5,349,385 | * | 9/1994 | Glenn ................................. 348/445 |
| 5,677,738 | * | 10/1997 | Mizutani et al. .................... 348/445 |
| 5,715,013 | * | 2/1998 | Kang .................................. 348/564 |
| 5,875,000 | * | 2/1999 | Yamaguchi .......................... 348/564 |

FOREIGN PATENT DOCUMENTS

WO 94/19905 * 9/1994 (WO) .............................. H04N/7/01

* cited by examiner

*Primary Examiner*—David E. Harvey

(57) ABSTRACT

An automatic aspect ratio (AR) compensating apparatus for a television receiver having a double window function which enables a full-screen display of two video sources having different ARs. The apparatus includes a memory control and reformatting section for receiving and storing in a memory analog-to-digital-converted and horizontally filtered video data of the video sources, detecting the ARs of the respective video sources from the stored video data, and reformatting the stored video data to compensate for the respective ARs, first digital-to-analog (D/A) conversion sections for reading out the video data of the video sources from the memory line-by-line in a vertical direction, D/A-converting, sampling/holding, and low-pass-filtering the read video data, respectively, and second analog-to-digital (A/D) conversion sections for A/D-converting output signals of the first D/A conversion sections utilizing a sampling value in a vertical direction so that the number of vertical data becomes the optimum number of effective scanning lines, and storing the converted video data in the external memory.

9 Claims, 8 Drawing Sheets

| $a_{1,1}$ | $a_{1,2}$ | ... | $a_{1,n}$ | $b_{k,1}$ | $b_{k,2}$ | ... | $b_{k,n}$ |
|---|---|---|---|---|---|---|---|
| $a_{2,1}$ | $a_{2,2}$ | ... | $a_{2,n}$ | $b_{k+1,1}$ | $b_{k+1,2}$ | ... | $b_{k+1,n}$ |
| ⋮ | ⋮ | | ⋮ | ⋮ | ⋮ | | ⋮ |
| $a_{y,1}$ | $a_{y,2}$ | ... | $a_{y,n}$ | $b_{k+y,1}$ | $b_{k+y,2}$ | ... | $b_{k+y,n}$ |

AUTOMATIC ASPECT RATIO CONVERTING APPARATUS FOR TELEVISION RECEIVER

BACKGROUND OF THE INVENTION

The present invention relates generally to an automatic picture aspect ratio conversion for a television receiver. In particular, the present invention relates to an automatic aspect ratio (AR) detecting method and AR compensating apparatus for a television receiver having a double window function whereby the ARs of two different video sources are detected, and if the detected ARs are different from each other, they are respectively converted into those most suitable for being displayed as double window pictures on a screen of the television receiver.

A conventional AR converting apparatus for a television receiver, as shown in FIG. 1, includes a sync separating section 10 for separating a sync signal from an input luminance signal Y, a pulse generating section 20 for generating a pulse signal for pedestal clamping utilizing the sync signal outputted from the sync separating section 10, a luminance detecting section 30 for detecting existence/nonexistence of the luminance signal in accordance with the pedestal clamping pulse signal generated from the pulse-generating section 20, a latch 40 for temporarily storing data for existence/nonexistence of the luminance signal outputted from the luminance detecting section 30, a dedicated microcomputer 50 for aspect ratio conversion (ARC) for receiving the data for existence/nonexistence of the luminance signal from the latch 40 and detecting the width of a horizontal scanning line during a vertical sync signal period to detect the AR of an input video signal, and a main microcomputer 60 for compensating for deflection data in accordance with the AR detected by the ARC-dedicated microcomputer 50.

Meanwhile, a typical television receiver having a double window function, as shown in FIG. 3, includes main-channel and sub-channel decoders 101 and 102 for decoding an input main-channel composite video signal MCVBS and sub-channel composite video signal SCVBS, respectively, a controller 103 for clamping, filtering, and data-processing the composite video signals decoded by the main-channel and sub-channel decoders 101 and 102, a video random access memory (RAM) 104 for storing and outputting data processed through the controller 103, an amplifying section 105 for amplifying video signals of Y, U, V and R, G, B processed through the controller 103 to a level suitable to be displayed, and a switching and deflection section 106 for switching the video signals amplified through the amplifying section 105 and controlling the deflection of a cathode ray tube in horizontal and vertical directions to display the double window pictures.

The controller 103, as shown in FIG. 4, comprises clamp and analog-to-digital (A/D) conversion sections 201 and 301 for clamping and converting the main-channel and sub-channel composite video signals into digital data, respectively, horizontal/vertical filters 202 and 302 for filtering the data converted through the clamp and A/D conversion sections 201 and 301 in horizontal and vertical directions, line memories 203 and 303 for storing the data filtered through the horizontal/vertical filters 202 and 302 line-by-line, phase-locked loop (PLL) and clock generating sections 204 and 304 for controlling the operating timing of the respective circuit blocks, an external memory control section 205 for storing the data provided from the line memories 203 and 303 in an external memory (i.e., the video RAM), reformatting the data stored in the external memory, and storing the reformatted data in a line memory 206 line-by-line, and a display control section 207 for controlling a digital-to-analog (D/A) conversion and buffering section 208 so that the section 208 converts the data from the line memory 206 into an analog video signal, and buffers the converted analog video signal to display the analog video signal on the display screen.

The operation of the conventional ARC apparatus for a doublewindow television receiver as constructed above will now be explained.

Referring to FIG. 1, the sync separating section 10 separates the sync signal from the input luminance signal Y and outputs the separated sync signal to the pulse generating section 20. The pulse generating section 20 generates the pedestal clamping pulse signal utilizing the sync signal.

The luminance detecting section 30 produces a reference voltage in accordance with the pedestal clamping pulse signal outputted from the pulse generating section 20 and detects the existence/nonexistence of the luminance signal by comparing the reference voltage with the luminance signal level during a horizontal scanning period.

The data for the existence/nonexistence of the luminance signal is inputted to the latch 40, and thus the ARC-dedicated microcomputer 50 enters into a rising edge interrupt mode during a vertical sync signal period as shown in FIG. 2. In the rising edge interrupt mode, the ARC-dedicated microcomputer 50 counts the number of the horizontal sync pulses H-sync until the rising edge of the data inputted from the latch 40 is detected in order to detect the point where a horizontal scanning line having the luminance signal starts. At this time, if the luminance signal exists, the data becomes a 'high' level, while if the luminance signal does not exist, the data becomes a 'low' level.

If the rising edge is detected during the counting operation of the horizontal sync pulses, the currently counted value will correspond to a start point.

If the start point is detected as above, the ARC-dedicated microcomputer 50 resets the currently counted value, enters into a falling edge interrupt mode, and counts the number of the horizontal sync pulses until the falling edge of the data is detected.

If the falling edge is detected during the counting operation of the horizontal sync pulses, the currently counted value will correspond to an end point.

As a result, the interval between the start point and the end point which are detected by counting the horizontal sync pulses will be the width of the horizontal sync signal. The horizontal data regarding the width of the horizontal sync signal is outputted to the main microcomputer 60 to compensate for the deflection data of the deflection circuit.

Meanwhile, the operation of the conventional television receiver having a double window function will now be explained.

Referring to FIG. 3, the main-channel and sub-channel decoders 101 and 102 receive and decode the main-channel and sub-channel composite video signals MCVBS and SCVBS, respectively, and output the decoded signals to the controller 103.

Referring to FIG. 4, the clamp and A/D conversion sections 201 and 202 in the controller 103 clamp the main-channel and sub-channel video signals outputted from the main-channel and sub-channel decoders 101 and 102, and convert the clamped video signals into video data, respectively. The horizontal/vertical filters 202 and 302 filter the converted video data, respectively, and the line memories 203 and 303 store therein the filtered data line-by-line, respectively.

The PLL and clock generating sections 204 and 304 control the operating timing of the respective circuit blocks in the controller 103.

The external memory control section 205 stores the video data in putted from the line memories 203 and 303 in the external memory, reformats the stored data, and stores the reformatted data in the line memory 206 line-by-line.

The display control section 207 controls the D/A conversion and buffering section 208 so that the D/A conversion and buffering section 208 converts the data inputted from the line memory 206 into an analog video signal and buffers the converted analog signal.

The video signals of Y, U, V and R, G, B processed by the controller 103 are amplified through the amplifying section 105 to the level suitable to be displayed, and the amplified video signals are outputted to the switching and deflection section 106. Accordingly, the video signals, the ARs of which are controlled according to the deflection data compensated for by the compensating apparatus of FIG. 1, are displayed on the screen as the double window pictures.

Here, the pixel rate of the video data inputted to the line memories 203 and 303 is determined as follows:

The luminance signal is sampled at a sampling frequency of 1728 horizontal sync pulses (i.e,. about 27 MHz). The sampled luminance signal is filtered through the horizontal/vertical filters 202 and 302, and then down-sampled so as to have a pixel rate of 864 horizontal sync pulses (i.e., about 13.5 MHz).

The size of the picture to be displayed is determined by reducing the video signal through the above-described process. For example, in case of the NTSC type normal picture, the whole picture has 672 pixels per line and has an acquisition area of 228 lines per field. In case of the double window pictures, the picture size is reduced by ½ in the horizontal direction, and thus each picture has 336 pixels per line and an acquisition area of 228 lines per field.

There exist various video sources having different ARs such as Cinema of 286 lines (LD), Vista of 324 lines (LD), a 4×3 video source of 486 lines, etc. If two video sources having different ARs from each other are inputted to form the double widow pictures, their start and end points where the corresponding video signals start and end during the horizontal sync signal period become different from each other. Accordingly, if the two different video signals inputted to the controller are processed through the clamp and A/D conversion sections and the horizontal/vertical filters, and then stored in the line memories to form the double window pictures, the waveforms of the main-picture and sub-picture signals in the horizontal scanning line, where the main-picture signal exists but no sub-picture signal exists, are represented as shown in FIG. 5, and thus either of the main-picture and the sub-picture displayed on the screen as the double window will leave upper and lower panels (shaded portions) as shown in FIG. 6.

As a result, according to the conventional ARC apparatus as described above, only one video source can be displayed in a full screen, but in a television having a double window function, the AR compensation cannot be respectively effected with respect to two video sources.

Further, even though the picture size can be varied by varying the deflection parameter, such a picture size variation will be simultaneously applicable to both video sources. Accordingly, in case of the two video sources having different ARs, either of the two video sources displayed on the screen will leave unnecessary upper and lower panels as described above.

Furthermore, the vertical size compensation in accordance with the variation of deflection data will bring out the variation of the gap between the horizontal scanning lines, and this exerts a bad influence upon the resolution in the vertical direction.

SUMMARY OF THE INVENTION

It is an object of the present invention to solve the problems involved in the related art, and to provide an automatic aspect ratio compensating apparatus for a television receiver which enables a full-screen display of double window pictures by compensating for the aspect ratios of two input video sources, respectively.

It is another object of the present invention to provide an automatic aspect ratio detecting method for a television receiver which can detects the aspect ratios of the two input video sources for forming the double window pictures to compensate for the respective aspect ratios of the video sources.

In one aspect of the present invention, there is provided an aspect ratio detecting method for a television receiver comprising the steps of:

1) detecting existence/nonexistence of a horizontal sync signal separated from an input video signal;

2) repeatedly performing the horizontal sync signal detection for one frame with the number of effective scanning lines increased one-by-one if it is detected that the horizontal sync signal exists;

3) determining that no video signal exist if it is detected that the horizontal sync signal does not exist, and replacing the number of effective scanning lines with the optimum number of effective scanning lines of the television receiver; and 4) making the number of effective scanning lines obtained at step 2) equal to the optimum number of effective scanning lines obtained at step 3) to detect the aspect ratio of the input video signal.

In another aspect of the present invention, there is provided an aspect ratio compensating apparatus for a television receiver for detecting aspect ratios of input video sources different from each other and displaying the video sources as double window pictures, the apparatus comprising:

a memory control and reformatting section for receiving and storing in an external memory analog-to-digital-converted and horizontally filtered video data of the video sources, detecting the aspect ratios of the respective video sources from the stored video data, and reformatting the stored video data to compensate for the respective aspect ratios;

first digital-to-analog (D/A) conversion sections for reading out the video data of the video sources from the external memory line-by-line in a vertical direction, digital-to-analog-converting, sampling/holding, and low-pass-filtering the read video data, respectively; and second analog-to-digital (A/D) conversion sections for analog-to-digital-converting output signals of the first D/A conversion sections utilizing a sampling value in a vertical direction so that the number of vertical data becomes the optimum number of effective scanning lines, and storing the converted video data in the external memory.

BRIEF DESCRIPTION OF THE DRAWINGS

The above objects, other features and advantages of the present invention will become more apparent by describing the preferred embodiment thereof with reference to the accompanying the drawings, in which.

DETAILED DESCRIPTION OF THE PREFERRED EMBODIMENT

Figure 8:
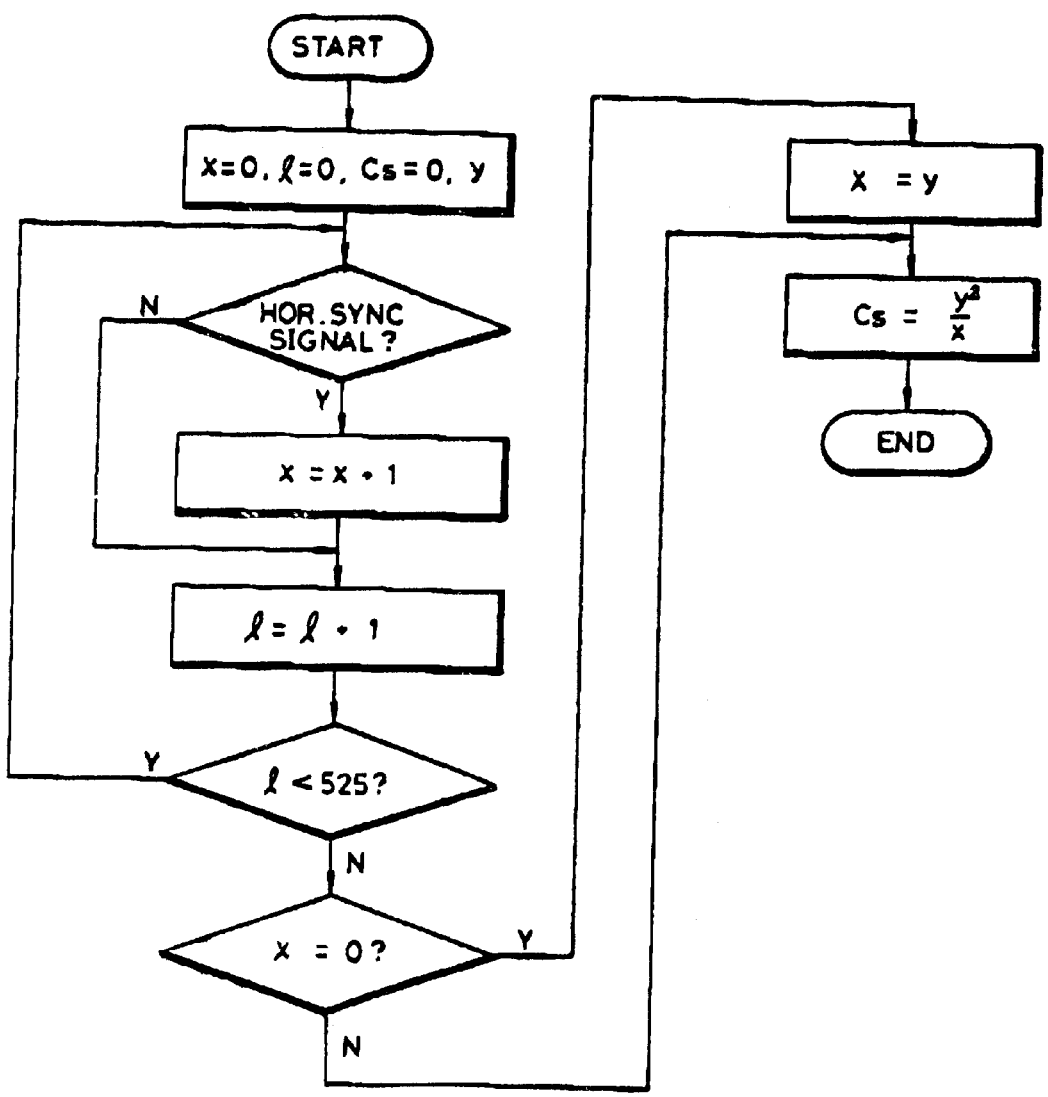
FIG. 8 is a flowchart illustrating the aspect ratio detecting method for a television receiver according to the present invention.

FIG. 8 is a flowchart incorporating the automatic aspect ratio detecting method for a television receiver according to the present invention.

Referring to FIG. 8, the aspect ratio (AR) detecting method according to the present invention comprises the steps of 1) detecting existence/nonexistence of a horizontal sync signal separated from an input video signal; 2) repeatedly performing the horizontal sync signal detection for one frame with the number x of effective scanning lines increased one-by-one if it is detected that the horizontal sync signal exists; 3) determining that no video signal exist if it is detected that the horizontal sync signal does not exist, and replacing the number x of effective scanning lines with the optimum number y of effective scanning lines of the television receiver; and 4) making the number x of effective scanning lines obtained at step 2) equal to the optimum number y of effective scanning lines obtained at step 3) to detect the aspect ratio of the input video signal.

Figure 1:
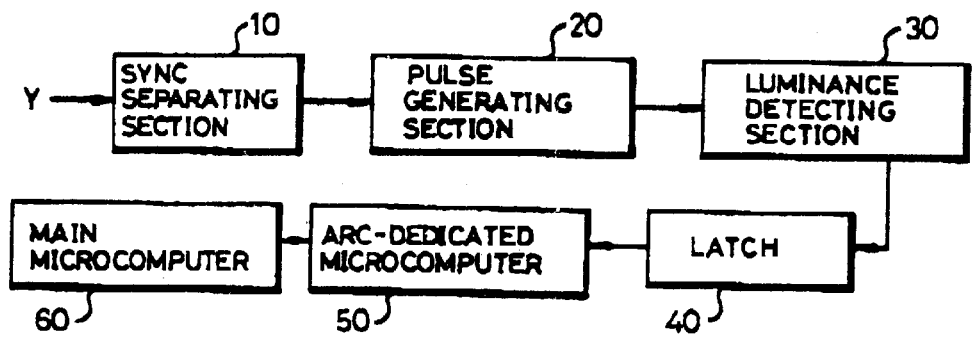
FIG. 1 is a block diagram of a conventional aspect ratio converting apparatus for a television receiver.
Figure 2:
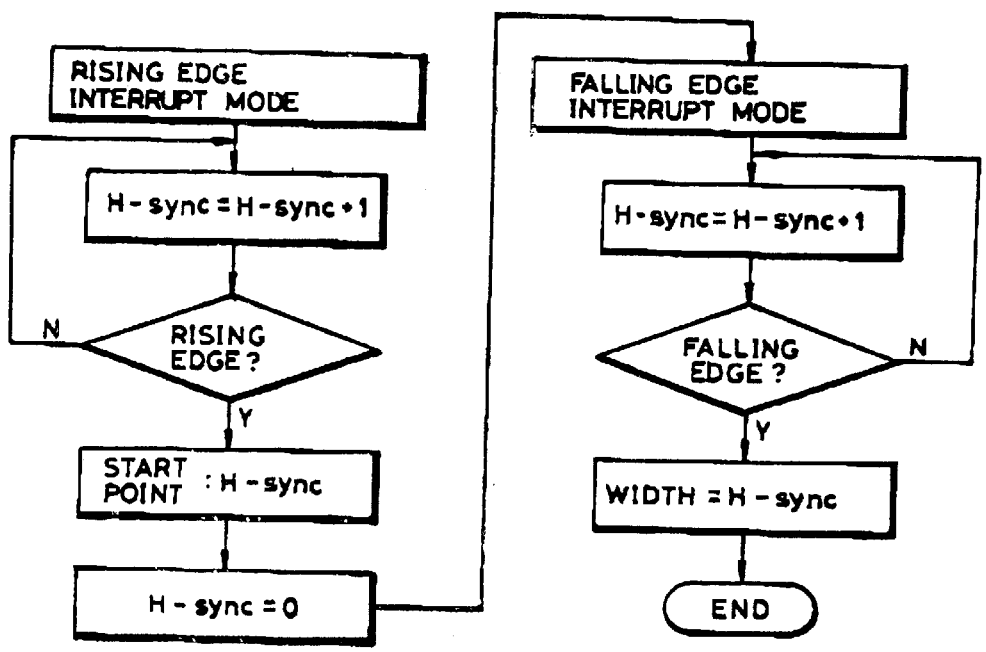
FIG. 2 is a flow chart illustrating the aspect ratio detecting method performed by the conventional apparatus of FIG. 1.
Figure 3:
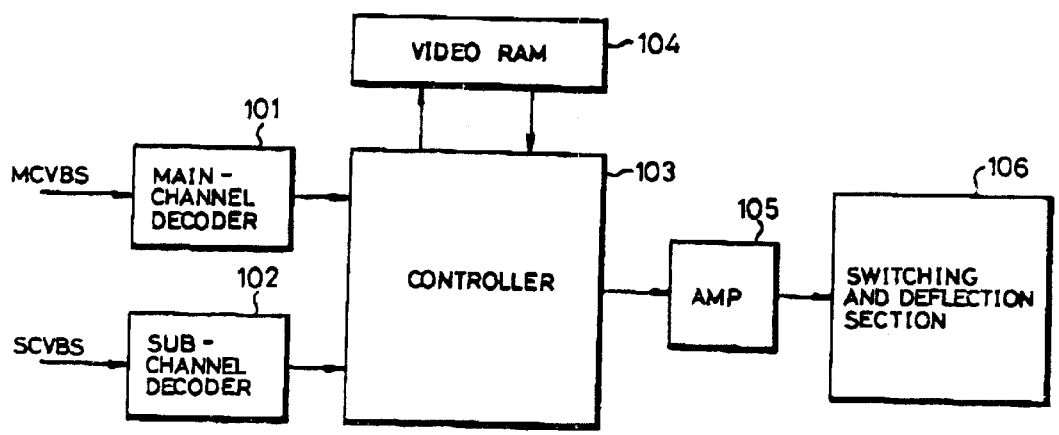
FIG. 3 is a block diagram schematically illustrating the construction of a conventional television receiver having a double window function.
Figure 4:
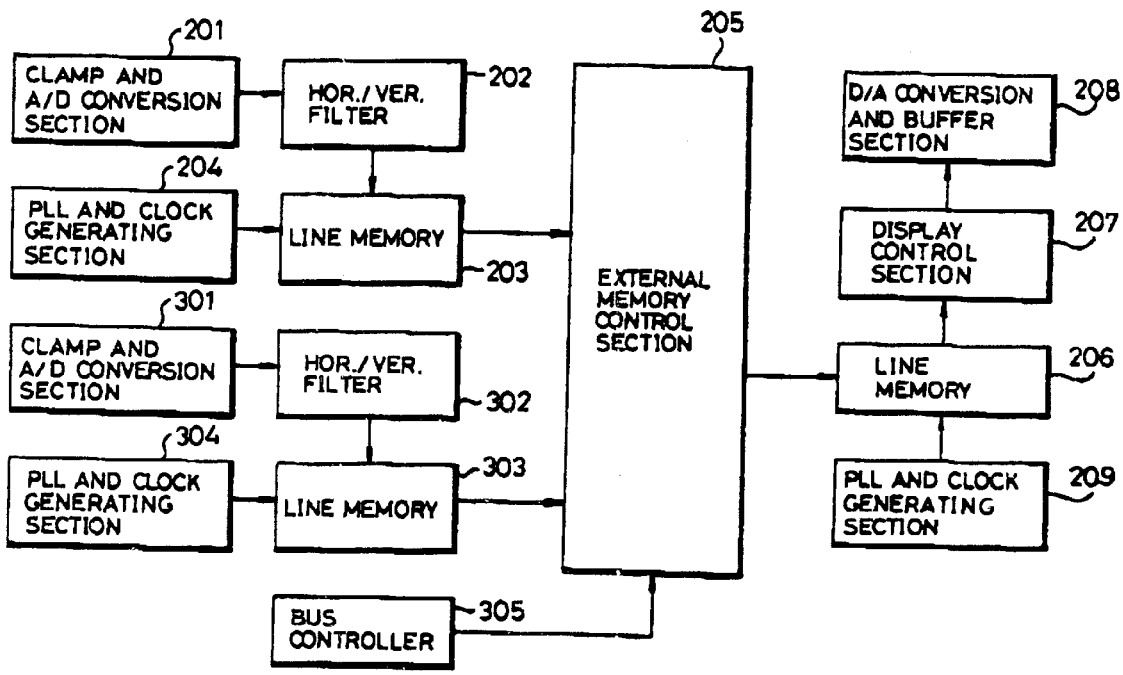
FIG. 4 is a block diagram of the controller in the television receiver of FIG. 3.
Figure 5:
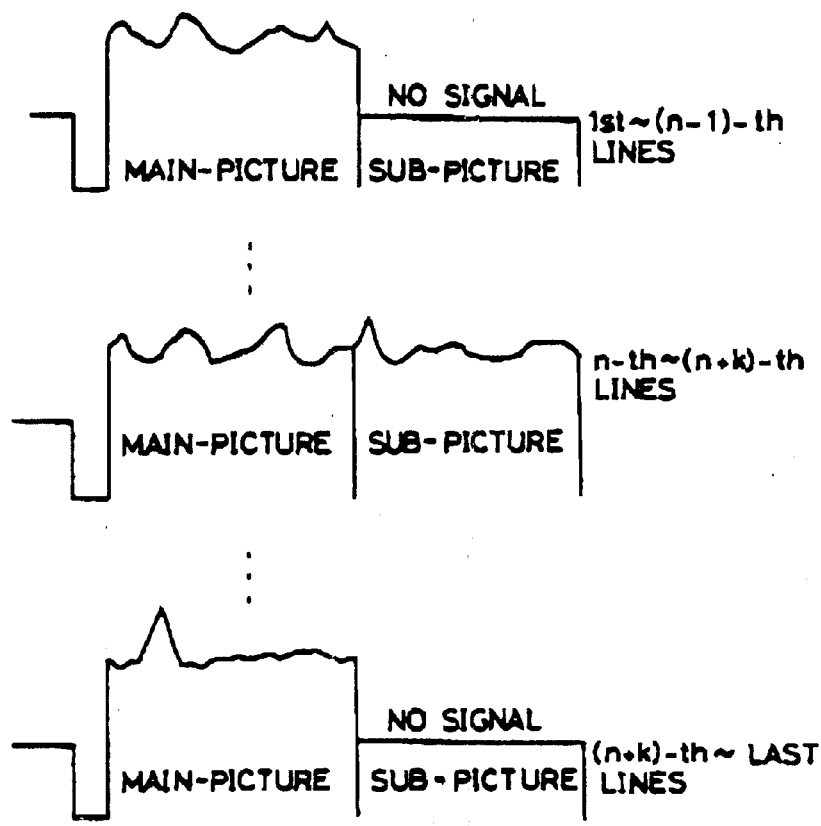
FIG. 5 is a waveform diagram of the main-picture signal and the sub-picture signal processed by the television receiver of FIG. 3.
Figure 6:
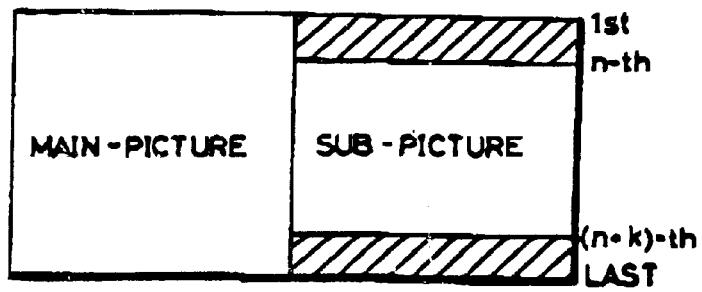
FIG. 6 is a view illustrating the display state of the double window pictures due to the aspect ration difference between the main-picture signal and the sub-picture signal.
Figure 7:
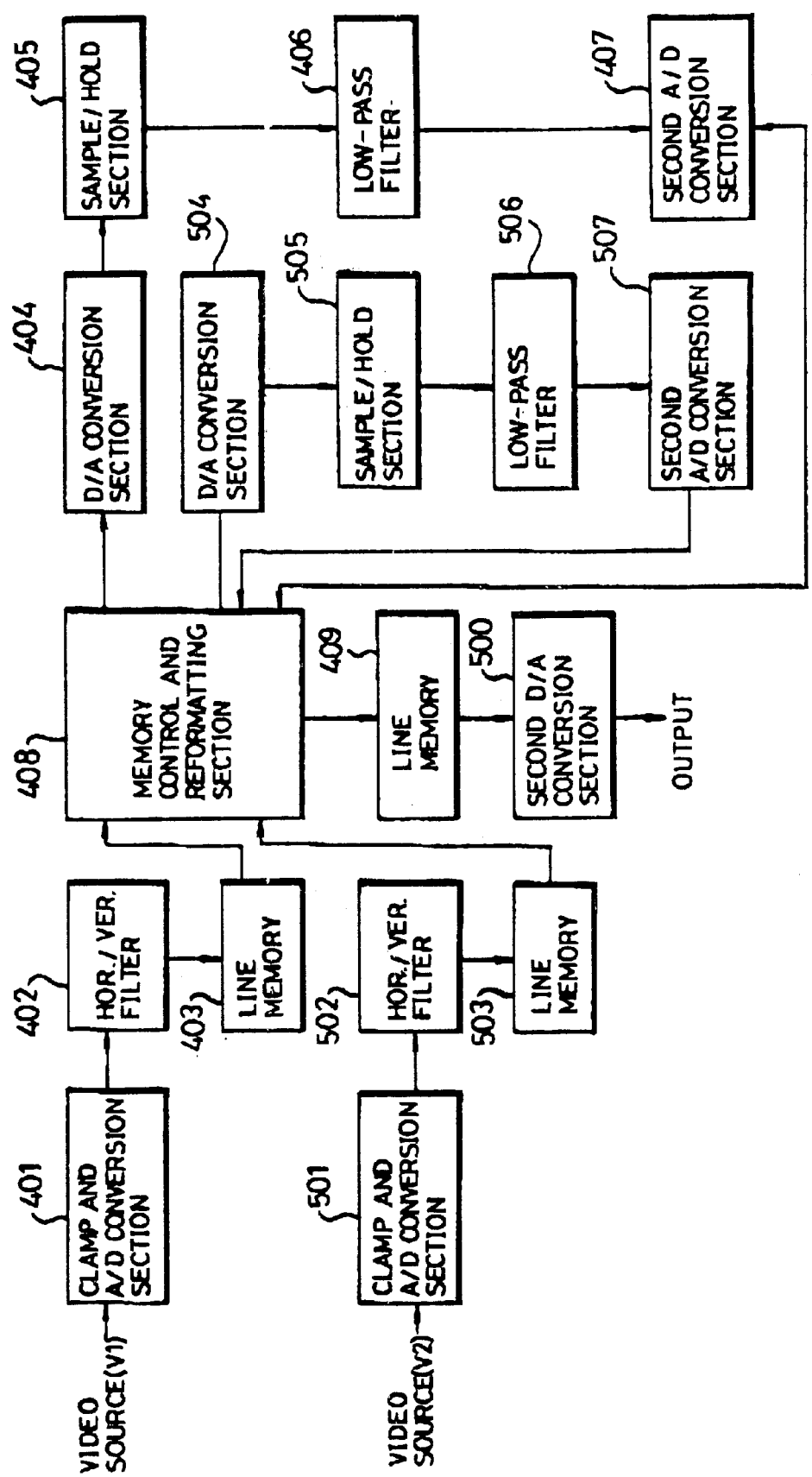
FIG. 7 is a block diagram of the aspect ratio compensating apparatus for a television receiver according to the present invention.

Referring to FIG. 7, the AR compensating apparatus for a television receiver according to the present invention includes first clamp and A/D conversion sections 401 and 501 for clamping and converting two input video sources V1 and V2 into digital video data, respectively, horizontal/ vertical filters 402 and 502 for filtering the video data outputted from the clamp and A/D conversion sections 401 and 501 in horizontal and vertical directions, respectively, line memories 403 and 503 for storing the video data filtered through the horizontal/vertical filters line-by-line, respectively, a memory control and reformatting section 408 for reading out the video data stored in the line memories 403 and 503, storing the read-out video data per line in an external memory in an alternate manner in conformity with the interlaced scanning type of the television receiver until the video data of one frame is obtained, detecting the ARs of the respective video sources V1 and V2 from the read-out video data, and reformatting the video data stored in the external memory, first D/A conversion sections 404 and 504 for reading out the video data of one frame stored in the external memory line-by-line in the vertical direction and converting the video data read out line-by-line into analog video signals, respectively, sample/hold sections 405 and 505 for sampling and holding the analog video signals outputted from the first D/A conversion sections 404 and 504, respectively, low-pass filters 406 and 506 for low-pass-filtering the video signals outputted from the sample/hold sections 405 and 505, second A/D conversion sections 407 and 507 for A/D-converting the video signals filtered through the low-pass filters 406 and 506 utilizing a counted value of sampling in the vertical direction so that the number of vertical data becomes the optimum number of effective scanning lines and storing the converted video data in the external memory, and a second D/A conversion section 500 for receiving the video data whose AR is compensated for by the memory control and reformatting section 408 through a line memory 409 and converting the received video data into an analog video signal.

The operation of the present apparatus as constructed above will now be explained. Since the two video signals are processed in the same manner, explanation of only one video signal will be given hereinafter.

First, if a video source is inputted to the clamp and A/D conversion section 401, it is clamped and A/D-converted through the clamp and A/D conversion section 401, and the converted digital video data is outputted to the horizontal/ vertical filter 402.

The horizontal/vertical filter 402 filters the input video data in the horizontal and vertical directions, and stores the filtered data line-by-line in the line memory 403.

The memory control and reformatting section 408 reads out the video data line-by-line from the line memory 403, and stores the read-out video data in the external memory. At this time, since the television receiver adopts the interlaced scanning type, the video data read out line-by-line is stored in an alternate manner to obtain a complete frame of the video data.

During the above-described process, the AR of the video source is detected utilizing the horizontal data of the video source. Referring to FIG. 8, the AR detection according to the present invention will be explained.

First, it is detected whether or not the horizontal sync signal separated from the video source is inputted. If it is detected that the horizontal signal is inputted, such a horizontal signal detection is repeatedly performed for a frame (i.e., 525 lines) by increasing the number x of effective scanning lines one-by-one. The counted value of the effective scanning lines obtained by the above-described detection is determined as the number of effective scanning lines of the video source. If it is detected that the horizontal signal is not inputted, it means that no video signal exists, and the number x of effective scanning lines is replaced with the optimum number y of effective scanning lines of the television receiver.

The value x of effective scanning lines corresponds to a vertical range where the video signal exists. In order to effect the full-screen display, the vertical range should be equal to the optimum number y of effective scanning lines of the television receiver. Specifically, since the video signal is divided into y lines in the vertical direction in a general television receiver, the vertical range which includes x effective lines will be composed of y lines if the vertical range is divided into y lines, and thus the full-screen display of the video signal will be possible.

To do so, the following expression is given x:y=y:Cs where, Cs represents the number of sampling in the vertical direction, i.e., the number to be divided by in the vertical direction.

From the above expression, we have $Cs = y^2/x$

In other words, if the analog vertical signal composed of x lines is converted into digital data by the sampling number Cs, the number of effective scanning lines becomes y. Thus, the value Cs should be inputted to the second A/D conversion section 407.

The memory control and reformatting section 408 reads out the video data of a frame stored in the external memory line-by-line in the horizontal direction, and the D/A conversion section 404 converts the video data from the memory control and reformatting section 408 into an analog video signal. The sample/hold section 405 and the low-pass filter 406 smooth the analog video signal from the D/A conversion section 404, and outputs the smoothed analog video signal to the second A/D conversion section 407.

The second A/D conversion section 407 converts the inputted analog video signal into digital video data utilizing the sampling value Cs in the vertical direction so that the number of vertical data becomes y, and outputs the digital data to the memory control and reformatting section 408.

In storing the digital data in the external memory, the memory control and reformatting section 408 stores the digital data, starting from the start point of the video signal, so that only the effective signals are stored except for the region where no signal exists.

The above process should be performed as many as the pixel numbers of one horizontal scanning period of the frame. Here, x is defined as the pixel number of a horizontal scanning period.

Figure 11:
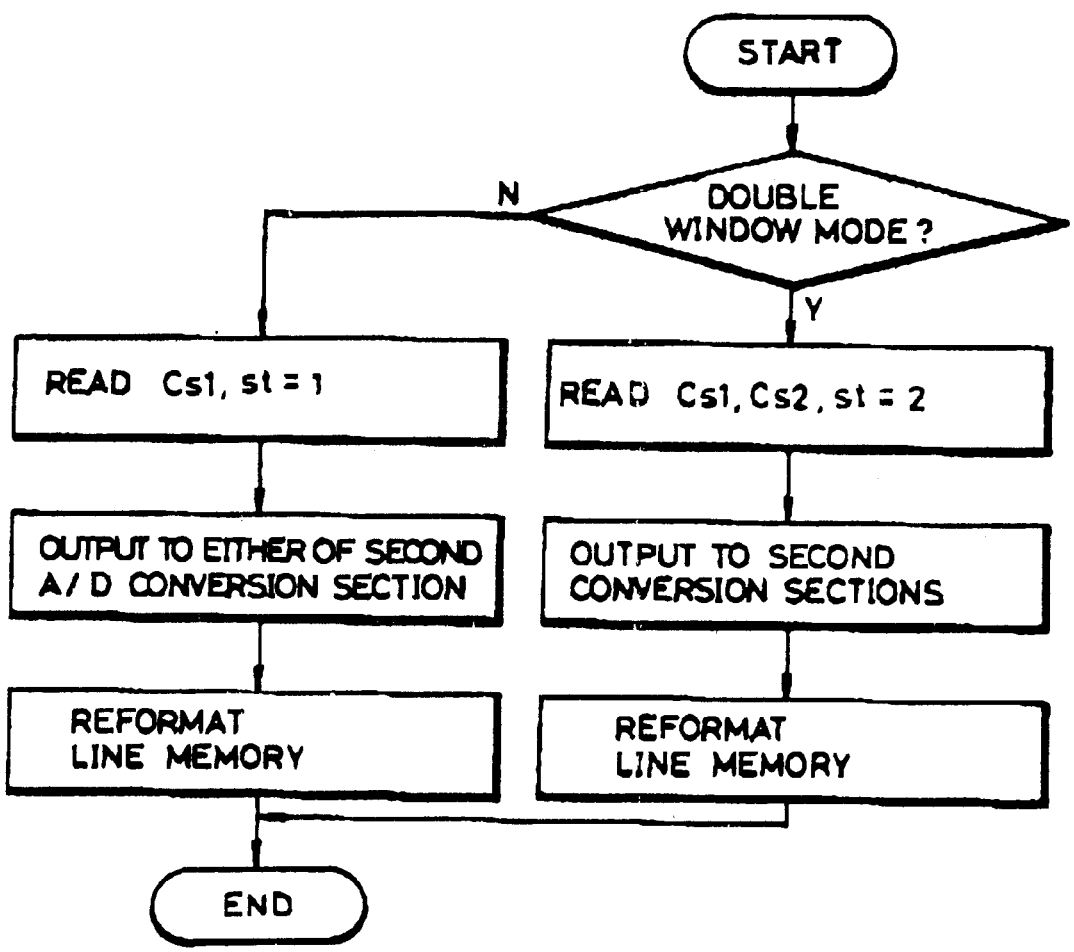
FIG. 11 is a flowchart explaining the operation of the memory control and reformatting section in the apparatus of FIG. 7.

Thereafter, the memory control and reformatting section 408, as shown in FIG. 11, determines whether or not the present mode selected by a user is a double window mode. If so, the memory control and reformatting section 408 stores in the external memory the digital data converted through the second A/D conversion sections 407 and 507 by the vertical sampling value Cs obtained during the AR detection. The format of the data stored in the external memory is shown in FIG. 10.

If it is determined that the present mode is a normal picture mode, the memory control and reformatting section 408 stores in the external memory the digital data from either of the second A/D conversion sections 407 and 507. At this time, the stored data occupies only the left half portion of the table of FIG. 10.

Thereafter, reformatting of the line memory is performed with a step variable st which is determined when the double window mode is selected.

Figures 9, 10:
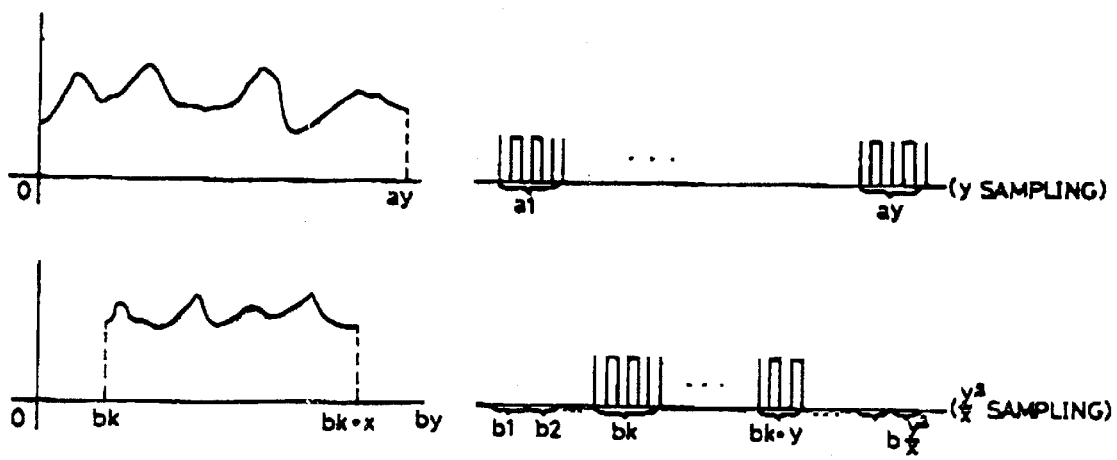
FIG. 9 is a graph illustrating the video data in which the vertical signal has been A/D-converted according to the present invention.
FIG. 10 is a view illustrating the format of the data stored in the external memory in the apparatus of FIG. 7.
Figure 12:
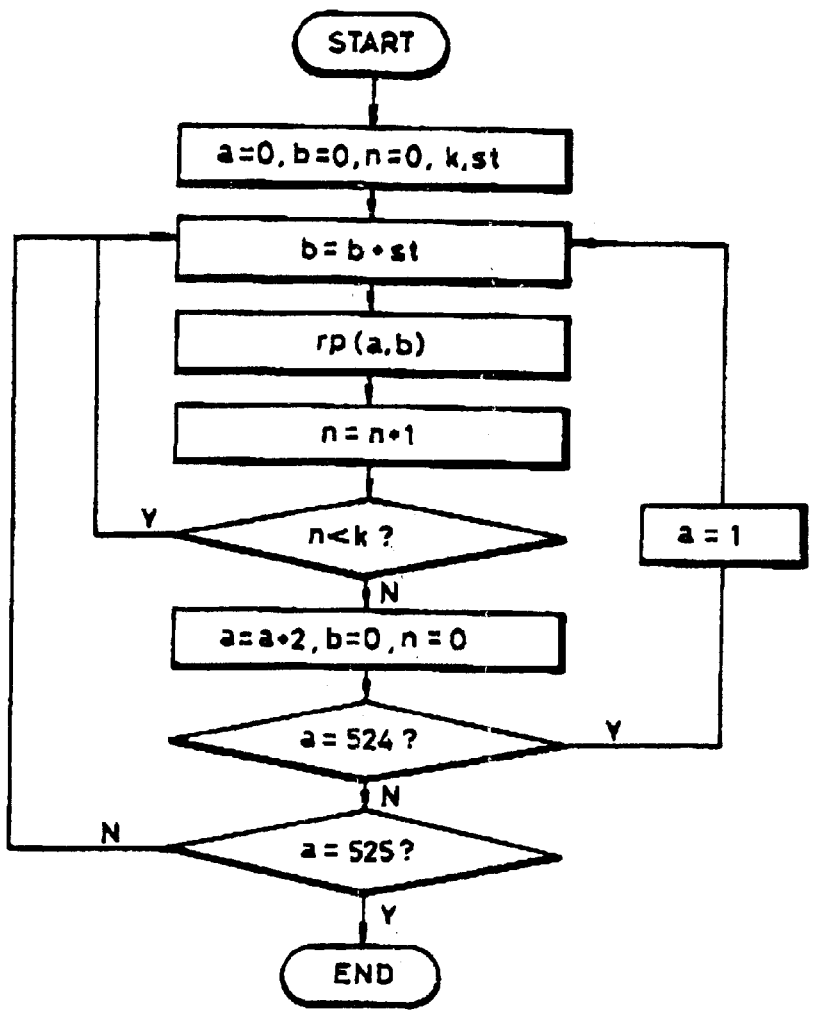
FIG. 12 is a flowchart explaining the process of reformatting the data stored in the line memory in the apparatus of FIG. 7.

Specifically, as shown in FIG. 12, after moving the position of the read point rp(a, b), the memory control and reformatting section 408 reads out the data stored as shown in FIG. 10. Here, "a" of the read point rp(a, b) represents data in the vertical direction, and "b" represents data in the horizontal direction.

The value of the horizontal data b is outputted in such a manner that one horizontal line is read out by increasing the value of the step variable st, and the read-out data is converted into an analog signal through the second D/A conversion section 500. The read-out operation is repeated to reach the pixel number k of the horizontal scanning line.

Thereafter, the memory control and reformatting section 408 initializes the value b to go to a next horizontal line, and completes the reformatting of one field (i.e., odd field) by increasing the vertical data "a" by 2 until the vertical data "a" reaches 524 (i.e., a=524). In the same manner, the reformatting of one frame is completed by resetting the vertical data "a" to be a=1, and then increasing the vertical data by 2 until the vertical data reaches 525 (i.e., a=525).

Figure 13:
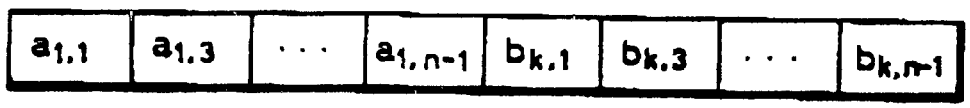
FIG. 13 is a view illustrating the format of the reformatted data in a double window mode in the flowchart of FIG. 12.
Figure 14:
FIG. 14 is a view illustrating the format of the reformatted data in a normal picture mode in the flowchart of FIG. 12.

In the double window mode, the format of the data read out by increasing the read point rp is shown in FIG. 13, while in the normal picture mode, the format of the data is shown in FIG. 14.

By the above-described process, the number of effective horizontal lines is kept constant, and thus the gap between the horizontal lines becomes normalized. Also, since the picture sizes of the video sources having different ARs are compensated for by changing the number of effective scanning lines to that most suitable for being displayed as the double window on the screen of the television receiver, well-balanced left and right pictures can be displayed without leaving unnecessary upper and lower shaded panels for either of the pictures caused by the AR difference between the input video sources.

From the foregoing, it will be apparent that the present invention provides the advantages that it can eliminate the variation of the gap between the horizontal lines since the vertical size of the picture is compensated for by changing the vertical data which corresponds to the number of horizontal liens. Also, in the double window mode, the picture sizes of the input video sources having different ARs are compensated for to have the same AR, and thus the full-screen display of the video sources can be effected without leaving the upper and lower shaded panels for either of the video sources.

While the present invention has been described and illustrated herein with reference to the preferred embodiment thereof, it will be understood by those skilled in the art that various changes in form and details may be made therein without departing from the spirit and scope of the invention.

What is claimed is:

1. An aspect ratio compensating method for a video display, comprising:

determining a first number of lines x of a digital signal which contain a video signal;

calculating a sampling ratio between the first number of lines x and a second number of lines y of the video display;

converting the digital signal to an analog signal; and sampling the analog signal using the sampling ratio to obtain a second digital signal having the second number of lines y containing a video signal.

2. The method of claim 1, wherein the determining step includes detecting the presence of a horizontal sync signal in a line of the digital signal.

3. The method of claim 2, wherein the determining step sets x equal to y if no horizontal sync signals are detected in the digital signal.

4. The method of claim 1, wherein the calculating step computes the sampling ratio by squaring y and dividing by x.

5. The method of claim 1, wherein the converting step converts columns of the digital signal into corresponding analog signals.

6. The method of claim 2, wherein the sampling step includes
   taking a number of samples of each corresponding analog signal equal to the sampling ratio.

7. An aspect ratio compensating apparatus for a video display, comprising:
   a memory control and reformatting section to determine a first number of lines x1 of a first digital signal which contain a video signal and to calculate a first sampling ratio between the first number of lines x1 and a number of lines y of the video display;
   a first digital-to-analog conversion section to convert the first digital signal to a first analog signal by columns; and
   a first analog-to-digital conversion section to sample the first analog signal using the first sampling ratio to output a first output digital signal to the memory control and reformatting section, the first output digital signal having the number of lines y containing a video signal.

8. The apparatus of claim 7, wherein the memory control and reformatting section determines a second number of lines x2 of a second digital signal which contain a video signal and calculates a second sampling ratio between the second number of lines x2 and the number of lines y of the video display, the apparatus further comprising:
   a second digital-to-analog conversion section to convert the second digital signal to a second analog signal by columns; and
   a second analog-to-digital conversion section to sample the second analog signal using the second sampling ratio to output a second output digital signal to the memory control and reformatting section, the second output digital signal having the second number of lines y containing a video signal.

9. The apparatus of claim 8, further comprising:
   a third digital-to-analog conversion section to selectively convert and output at least one of the first output digital signal and the second output digital signal based on a selection of a double window mode.

\* \* \* \* \*